Oct. 24, 1944.　　　T. ZIMMERMAN　　　2,361,142
WORK CHUCK
Filed Dec. 6, 1943　　　2 Sheets-Sheet 1
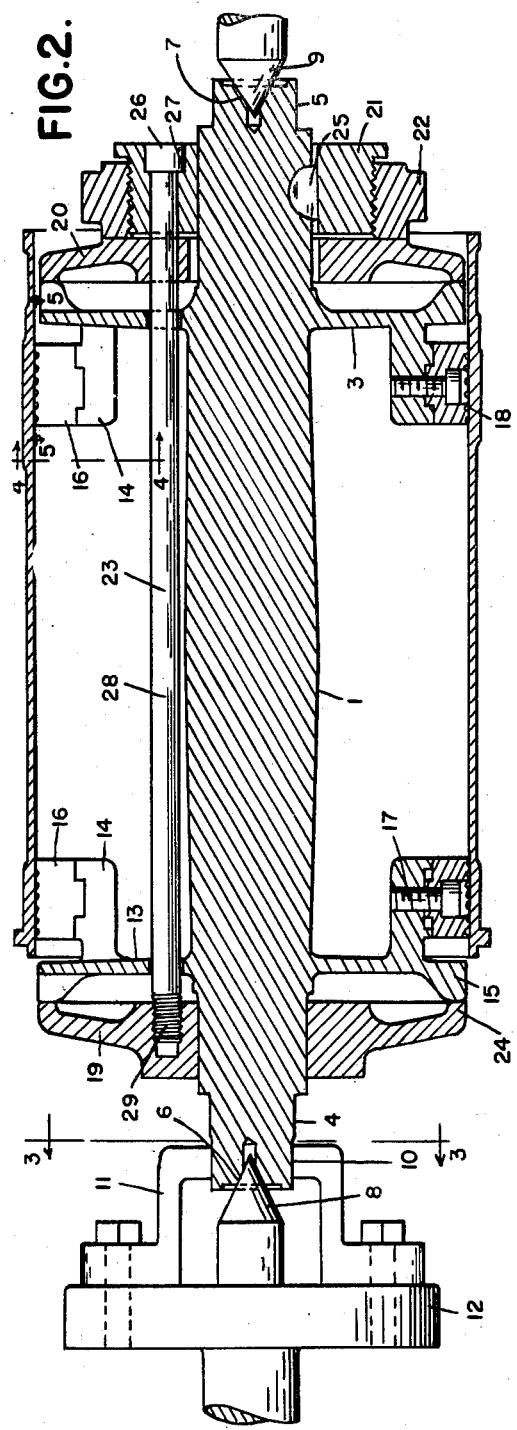
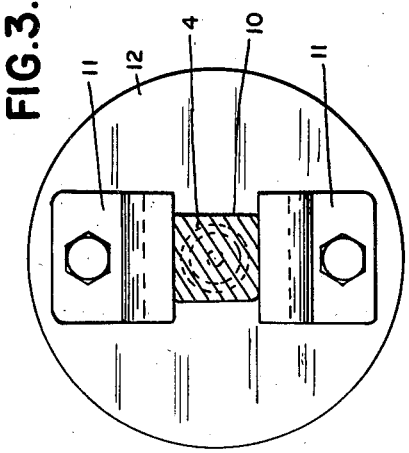
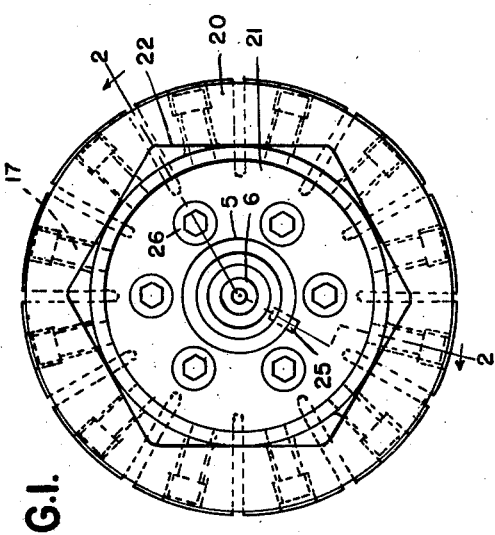
*INVENTOR.*
THOMAS ZIMMERMAN
BY *Whittemore Hulbert & Belknap*
ATTORNEYS Oct. 24, 1944.  T. ZIMMERMAN  2,361,142
WORK CHUCK
Filed Dec. 6, 1943  2 Sheets-Sheet 2
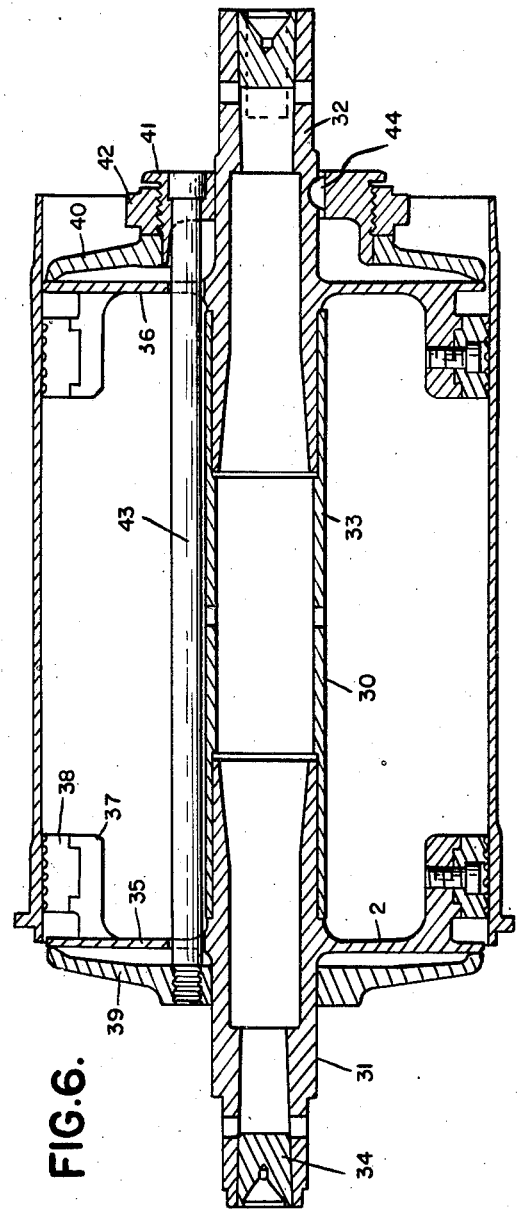
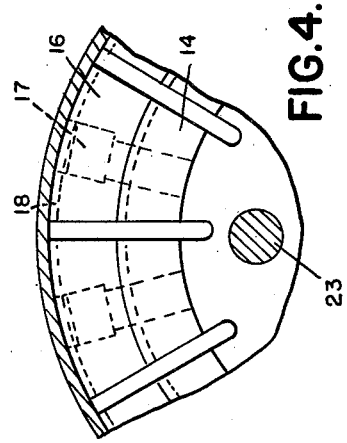
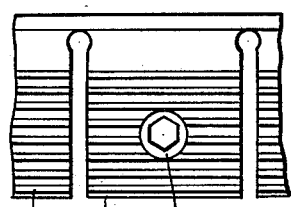
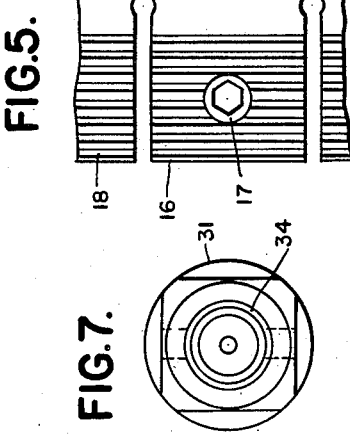
*INVENTOR.*
THOMAS ZIMMERMAN
BY
ATTORNEYS Patented Oct. 24, 1944

2,361,142

UNITED STATES PATENT OFFICE 2,361,142

WORK CHUCK

Thomas Zimmerman, Grosse Pointe Farms, Mich., assignor to Kelsey-Hayes Wheel Company, Detroit, Mich., a corporation of Delaware Application December 6, 1943, Serial No. 513,083

10 Claims. (Cl. 51—227)

The invention relates to work chucks and refers more particularly to diaphragm chucks for holding tubular work.

The invention has for one object to provide an improved chuck which is constructed to hold tubular work accurately in position.

The invention has for other objects to provide a chuck which maintains a true shape over a long period of operation and until wear of the clamping jaws occurs; and to provide a chuck in which the clamping jaws are replaceable.

The invention has for a further object to provide a chuck constituting a unit comprising an arbor member, diaphragms and means for operating the diaphragms to control the operation of the chuck.

These and other objects of the invention reside in the novel features of construction and combinations and arrangements of parts as more fully hereinafter set forth.

In the drawings—

Figure 1 is an end view of a work chuck embodying the invention;

Figure 2 is a cross section on the line 2—2 of Figure 1;

Figures 3, 4 and 5 are cross sections on the lines 3—3, 4—4, and 5—5, respectively, of Figure 2;

Figure 6 is a view similar to Figure 2 showing another modification of work chuck;

Figure 7 is an end view of the arbor member thereof.

The work chuck embodying the invention may be used to hold tubular work or various cross sections while various types of operations are being performed on the work. More particularly, the work chuck is designed to internally hold cylindrical work, such as a cylinder sleeve, a bushing, or a bearing, in a grinding machine while the external surface of the cylindrical work is being ground.

The work chuck, as illustrated in Figures 1 to 5, inclusive, comprises the arbor member 1, the diaphragms 2 and 3 on the arbor member, and actuating means for flexing the diaphragms also mounted on the arbor member. The arbor member is one-piece and has the end portions 4 and 5 which are formed with the axial countersinks 6 and 7, respectively, for mounting on the centers 8 and 9, respectively, of the grinding machine. The end portions 4 and 5 are also preferably formed to have square cross sections providing the pairs of opposite flat faces 10, one pair of which is adapted to engage the drive blocks 11 upon the drive plates 12 of the grinding machine.

The diaphragms 2 and 3 are spaced longitudinally of the arbor member 1 and also located longitudinally inwardly from its end portions 4 and 5. The diaphragms are integral with and extend radially outwardly from the arbor member and are provided with the resilient disc portions 13, the axially extending arms 14 which extend toward each other and are spaced radially outwardly of the disc portions 13, and the peripherally spaced axially extending bosses 15 near the outer edges of the diaphragms and extending from the diaphragms in directions opposite the arms 14. The arms 14 and the bosses 15 are preferably formed by machined radial slots. The arms 14 have radially outer arcuate faces with the same radius from the axis of the arbor member and each of the arms has the clamping jaws 16 secured to its radially outer face by the screw 17. The radially outer faces of the jaws are concentric with the radially outer faces of the arms and, furthermore, are preferably formed with the parallel grooves 18 providing teeth for engaging the radially inner face of the cylindrical work, which in the present instance is a thin walled cylinder sleeve. It will be noted that the radially outer faces of the teeth are located radially beyond the peripheries of the diaphragms so that the latter can not interfere with the mounting or demounting of the cylindrical work.

The means for flexing the diaphragms 2 and 3 to move the jaws 16 generally radially inwardly to released position comprises the collars 19 and 20, the abutment member 21, the nut 22 and the rods 23. The collar 19 is sleeved on the portion of the arbor member longitudinally beyond the diaphragm 2 toward the end portion 4. The collar 20 is sleeved on the arbor member longitudinally thereof from the diaphragm 3 toward the end portion 5. The two collars 19 and 20 have the peripheral flanges 24 which are engageable with the bosses 15 of the diaphragms. The abutment member 21 is slidably sleeved on the arbor member between the collar 20 and the end portion 5 and is held from rotation relative to the arbor member by suitable means, such as the key 25. The nut 22 is threaded on the abutment member and abuts the collar 20. The rods 23 extend longitudinally of the arbor member and are preferably equally spaced angularly of the arbor member. Each rod has a head 26 extending within a recess in the abutment 21 and providing the shoulder 27 abutting the inner end of the recess. Each rod also has the stem 28 which extends through the abutment member 21 and the collar 20, the disc portions of the diaphragms 3 and 2, and further has the externally threaded end portion 29 which is threaded into the collar 19. The construction is such that by rotating the nut 22 in the proper direction the peripheral flange 24 of the collar 20 is forced against the bosses 15 of the diaphragm 3 and at the same time the abutment 21 is forced away from the collar 20 and operates through the rods 23 upon the collar 19 to force its peripheral flange 24 against the bosses 15 of the diaphragm 2 with the result that diaphragms 2 and 3 are flexed and their outer peripheral portions are forced toward each other and the arms 14 of these diaphragms and their jaws 16 are move generally radially inwardly to released position. On the other hand, by turning the nut 22 in the opposite direction it will be seen that the diaphragms will be released and their arms and the jaws will be free to move generally radially outwardly under the inherent resiliency in the diaphragms so that the jaws will internally grip the cylinder sleeve and exert a predetermined pressure thereon. The construction is such that the pressures exerted by the jaws are equal so that the cylinder sleeve is not distorted from its cylindrical shape, but is held true and gripped sufficiently firmly to be held from rotation relative to the arbor member while the external surface is being ground. The mounting and demounting of the cylinder sleeve is accomplished while the chuck is removed from the grinding machine.

In the modification illustrated in Figures 6 and 7, the arbor member 30 of the work chuck, instead of being formed in one piece, is formed of the arbor end sections 31 and 32 and the arbor intermediate section 33, all being in axial alignment and the intermediate section being secured to the end sections to drive the one with the other. As shown, the intermediate section is telescoped over the inner parts of the end sections preferably with a tight fit sufficient to rotate the sections together. It will be noted that the end sections are tubular and provided with the plugs 34 fixedly secured therein and having the countersinks for receiving the centers of the grinding machine. It will also be noted that the end portion 31 is externally shaped, as shown in Figure 7, to provide opposite parallel flat faces for driving the arbor member from the grinding machine drive plate. In this construction the diaphragms 35 and 36 are integral with and extend radially outwardly from the arbor end sections 31 and 32, respectively. The arms 37 and the clamping jaws 38 are formed in much the same manner as the arms 14 and the clamping jaws 16 and are also secured in the same manner. However, the contact bosses at the peripheries or radially outer edges of the diaphragms are omitted. The means for flexing the diaphragms comprises the collars 39 and 40, the abutment 41, the nut 42 and the rods 43. The collar 39 is sleeved on the arbor end section 31 and engages the diaphragm 35 near its radially outer edge. The collar 40 is sleeved on the abutment 41 and abuts the diaphragm 36 near its radially outer edge. The abutment 41 is slidably sleeved on the arbor end section 32 and held from rotation relative thereto by the key 44. The nut 42 is threaded on the abutment and abuts the collar 40. In operation, rotation of the nut 42 in one direction is adapted to effect movement of the radially outer edges of the diaphragms 35 and 36 toward each other and generally radially inward movement of the clamping jaws 38 in the same manner as described in connection with Figures 1 to 5, inclusive. Also, rotation of the nut in the opposite direction provides for release of the diaphragms so that their inherent resiliency causes the clamping jaws to exert uniform pressure on the inner surface of the cylinder sleeve to accurately position the same while its external surface is being ground.

What I claim as my invention is:

1. A work chuck comprising an arbor member provided with mounting means at its ends, diaphragms on said arbor member, an annular series of clamping jaws on each of said diaphragms, and means on said arbor member for flexing said diaphragms to move said jaws.

2. A work chuck comprising an arbor member, diaphragms spaced longitudinally of said arbor member, an annular series of clamping jaws on each of said diaphragms, and means comprising a rotatable member for flexing said diaphragms to move said jaws generally radially.

3. A work chuck comprising an arbor member, diaphragms spaced longitudinally of said arbor member, an annular series of clamping jaws on each of said diaphragms, and means for flexing said diaphragms to move said jaws generally radially, said flexing means comprising members extending longitudinally of said arbor member and operatively connected to said diaphragms, and a rotatable member for actuating said longitudinally extending members.

4. A work chuck comprising an arbor member, diaphragms spaced longitudinally of said arbor member and extending radially outwardly therefrom, an annular series of clamping jaws on each of said diaphragms axially offset from the radially outer edge thereof, collars on said arbor member engageable with said diaphragms near their radially outer edges, and means comprising members extending longitudinally of said arbor member and a rotatable member for moving said collars to flex said diaphragms.

5. A work chuck comprising an arbor member, diaphragms spaced longitudinally of and extending radially outwardly from said arbor member, an annular series of clamping jaws on each of said diaphragms offset axially from the radially outer edge thereof, collars on said arbor member engageable with said diaphragms near the radially outer edges thereof, an abutment member nonrotatably sleeved on said arbor member, a nut threaded on said abutment member and engageable with one of said collars, and rods having head abutting said abutment member and threaded portions engaging the other of said collars.

6. A work chuck comprising an arbor member having its ends formed with means for mounting said arbor member with one of its ends formed with driving faces, resilient diaphragms on said arbor member and extending radially outwardly therefrom, clamping jaws on each of said diaphragms, and means on said arbor member for flexing said diaphragms to move said jaws.

7. A work chuck comprising an arbor member having spaced axially aligned sections and an intermediate connecting section, resilient diaphragms integral with and extending radially outwardly from said first mentioned sections, clamping jaws on each of said diaphragms axially offset therefrom near its outer edge, and means on said arbor member comprising collars on said first mentioned sections engageable with said diaphragms near their radially outer edges for flexing said diaphragms.

8. A work chuck comprising an arbor member provided with mounting means at its ends, diaphragms on said arbor member, an annular series of clamping jaws on each of said diaphragms axially offset therefrom, and means on said arbor member and comprising members engageable with said diaphargms near the radially outer edges thereof for flexing said diaphragms to move said jaws generally radially.

9. A work chuck comprising an arbor member provided with mounting means at its ends, a diaphragm on said arbor member and extending generally radially outwardly therefrom, a series of clamping jaws on said diaphragm axially offset from the radially outer edge thereof, and means on said arbor member comprising a member engageable with said diaphragm near the radially outer edge thereof for flexing said diaphragm.

10. A work chuck comprising an arbor member, a diaphragm integral with and extending generally radially outwardly from said arbor member, arms integral with said diaphragm and extending transversely thereof, clamping jaws detachably secured to said arms, and means on said arbor member and movable relative thereto for flexing said diaphragm.

THOMAS ZIMMERMAN.